US009721207B2

(12) United States Patent
Cama et al.

(10) Patent No.: US 9,721,207 B2
(45) Date of Patent: Aug. 1, 2017

(54) GENERATING WRITTEN CONTENT FROM KNOWLEDGE MANAGEMENT SYSTEMS

(71) Applicant: International Business Machines Corporation, Armonk, NY (US)

(72) Inventors: Karl J. Cama, Coppell, TX (US); Norbert Herman, Denver, CO (US); Daniel T. Lambert, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 14/287,432

(22) Filed: May 27, 2014

(65) Prior Publication Data

US 2015/0347901 A1 Dec. 3, 2015

(51) Int. Cl.

| | |
|---|---|
| ***G06F 17/00*** | (2006.01) |
| ***G06N 5/02*** | (2006.01) |
| ***G06F 17/30*** | (2006.01) |

(52) U.S. Cl.

CPC ....... *G06N 5/022* (2013.01); *G06F 17/30011* (2013.01); *G06F 17/30719* (2013.01)

(58) Field of Classification Search

CPC ..................... G06F 17/30864; G06F 17/30011

See application file for complete search history.

(56) References Cited

U.S. PATENT DOCUMENTS

| | | | |
|---|---|---|---|
| 5,924,072 A | 7/1999 | Havens | |
| 5,953,528 A | 9/1999 | Sullivan | |
| 6,820,071 B1 | 11/2004 | Sullivan | |
| 7,016,889 B2 * | 3/2006 | Bazoon | G06F 17/30716 706/48 |
| 7,305,406 B2 * | 12/2007 | Liu | G06F 17/30011 707/736 |
| 7,587,309 B1 * | 9/2009 | Rohrs | G06F 17/30864 704/10 |
| 7,639,386 B1 * | 12/2009 | Siegel | G06Q 40/025 358/1.18 |
| 8,275,811 B2 | 9/2012 | Reid et al. | |
| 8,341,107 B2 | 12/2012 | Arseneault et al. | |

(Continued)

OTHER PUBLICATIONS

"Content Foundry Article Scraper & Content Generator," captured by Internet Archive Wayback Machine on Jan. 2, 2014, p. 1-12, available at https://web.archive.org/web/20140102071859/http://contentfoundry.net/.*

(Continued)

*Primary Examiner* — Amelia Tapp

(74) *Attorney, Agent, or Firm* — Daniel Simek; Hoffman Warnick LLC

(57) ABSTRACT

The disclosure is directed to written content generation. A method for generating written content in an application in accordance with an embodiment includes: receiving a query from a user; importing data from at least one data source in response to the query; ranking the imported data based on a plurality of ranking factors to determine a relevance of the imported data; automatically generating written content using at least a portion of the imported data based on the determined relevance of the imported data; and automatically customizing the written content based on a file format of the application.

15 Claims, 5 Drawing Sheets

(56) References Cited

U.S. PATENT DOCUMENTS

| | | | | |
|---|---|---|---|---|
| 8,386,485 | B2 * | 2/2013 | Kerschberg | G06F 17/30648<br>707/736 |
| 9,053,190 | B1 * | 6/2015 | Boenau | G06F 17/30867 |
| 2005/0149343 | A1 | 7/2005 | Rhoads et al. | |
| 2006/0015803 | A1 | 1/2006 | Holloway et al. | |
| 2008/0183745 | A1 * | 7/2008 | Cancel | G06Q 30/02 |
| 2013/0268490 | A1 * | 10/2013 | Keebler | G06F 17/30575<br>707/627 |
| 2014/0019443 | A1 * | 1/2014 | Golshan | G06F 17/30867<br>707/723 |
| 2014/0089092 | A1 * | 3/2014 | Kilmer | G06Q 30/0269<br>705/14.58 |
| 2014/0222834 | A1 * | 8/2014 | Parikh | G06F 17/30719<br>707/748 |
| 2015/0248423 | A1 * | 9/2015 | Christolini | G06F 17/3089<br>715/202 |

OTHER PUBLICATIONS

Alavi et al., "Knowledge Management Systems: Issues, Challenges, and Benefits", Communications of the Association for Information Systems, vol. 1, Article 7, Feb. 1999, 37 pgs.

Alavi et al., "Knowledge Management Systems: Emerging Views and Practices from the Field", Proceedings of the 32nd Hawaii International Conference on System Sciences, 1999, IEEE, 11 pgs.

* cited by examiner

Menu Bar

Find: Application development 54

The application development and deployment software market is expected to generate revenue of $80.6 billion in 2012, growing 3.7 percent over the 2011 revenue of $77.8 billion
...

Src: Eweek bit.ly/SS6AYZ

56

Evolution of outsourcing over a 4 year period

Src: Sharepoint

58

50

52

GENERATING WRITTEN CONTENT FROM KNOWLEDGE MANAGEMENT SYSTEMS

TECHNICAL FIELD

The present invention relates generally to document generation, and more particularly, to generating written content from knowledge management (KM) systems.

RELATED ART

Software for generating written content algorithmically has recently become available. In many cases, the written articles are not only as good as a human author—they're nearly perfect. The algorithms have been used to generate long form articles, headlines, tweets, and other social media content. Currently available software for generating written content, however, does not have the ability to generate articles and market reports from corporate knowledge management systems.

Many corporations spend millions of dollars a year on knowledge management systems. Typically, in such systems, a customer is required to fill out a request form for data related to a particular subject. The forms are then sent to a service for fulfillment. Different articles (which may only be tangentially related to the desired subject) are then manually pulled by the service and delivered to the customer. Throughout this manual process, there may be many articles that are missed, because the information needed is located deep within the body of a document or buried in a presentation. Even worse, many irrelevant articles may be delivered to the customer. The type of "hunt and find' method that most analysts use is very inefficient, and most analysts will agree that finding the most relevant sources is more than half of the job.

SUMMARY

The present invention relates generally to document generation, and more particularly, to generating written content from knowledge management (KM) systems. In accordance with the present invention, data can be imported from a knowledge management system (e.g., a corporate knowledge management system) or other reliable websites or data sources (e.g., as rated by a crowd sourced community or using other metrics that may be defined by a user) in response to the receipt of a query. The imported data is analyzed to identify relevant data, and written content is automatically generated based on the identified relevant data.

The imported data can be ranked to determine relevance based on user defined metrics, including, but not limited to, total page views, expertise of the author, comments on the article, ratings, number of shares, reputation of the firm, trustworthiness of the data source (e.g., website), and/or the like. The written content is then generated using the relevant imported data, where the written content can be automatically customized for different file formats (e.g., bullet points for presentation software slides, sentences for word processing software, etc). Users can customize the type and subject matter of written content and specify the scope of data that should be imported.

A first aspect of the invention provides a method for generating written content in an application, comprising: receiving a query from a user; importing data from at least one data source in response to the query; ranking the imported data based on a plurality of ranking factors to determine a relevance of the imported data; automatically generating written content using at least a portion of the imported data based on the determined relevance of the imported data; and automatically customizing the written content based on a file format of the application.

A second aspect of the invention provides a system configured to perform a method for generating written content in an application, the method comprising: receiving a query from a user; importing data from at least one data source in response to the query; ranking the imported data based on a plurality of ranking factors to determine a relevance of the imported data; automatically generating written content using at least a portion of the imported data based on the determined relevance of the imported data; and automatically customizing the written content based on a file format of the application.

A third aspect of the invention provides a computer program product including program code embodied in at least one computer-readable storage medium, which when executed, enables a computer system to implement a method for generating written content in an application, the method comprising: receiving a query from a user; importing data from at least one data source in response to the query; ranking the imported data based on a plurality of ranking factors to determine a relevance of the imported data; automatically generating written content using at least a portion of the imported data based on the determined relevance of the imported data; and automatically customizing the written content based on a file format of the application.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION

The present invention relates generally to document generation, and more particularly, to generating written content from knowledge management (KM) systems.

In accordance with the present invention, data can be imported from a knowledge management system (e.g., a corporate knowledge management system) or other reliable websites or data sources (e.g., as rated by a crowd sourced community or using other metrics that may be defined by a user) in response to the receipt of a query. The imported data is analyzed to identify relevant data, and written content is automatically generated based on the identified relevant data.

The imported data can be ranked to determine relevance based on user defined metrics, including, but not limited to, total page views, expertise of the author, comments on the article, ratings, number of shares, reputation of the firm, trustworthiness of the data source (e.g., website), and/or the like. The written content is then generated using the relevant imported data, where the written content can be automatically customized for different file formats (e.g., bullet points for presentation software slides, sentences for word processing software, etc). Users can customize the type and subject matter of written content and specify the scope of data that should be imported.

Figure 1:
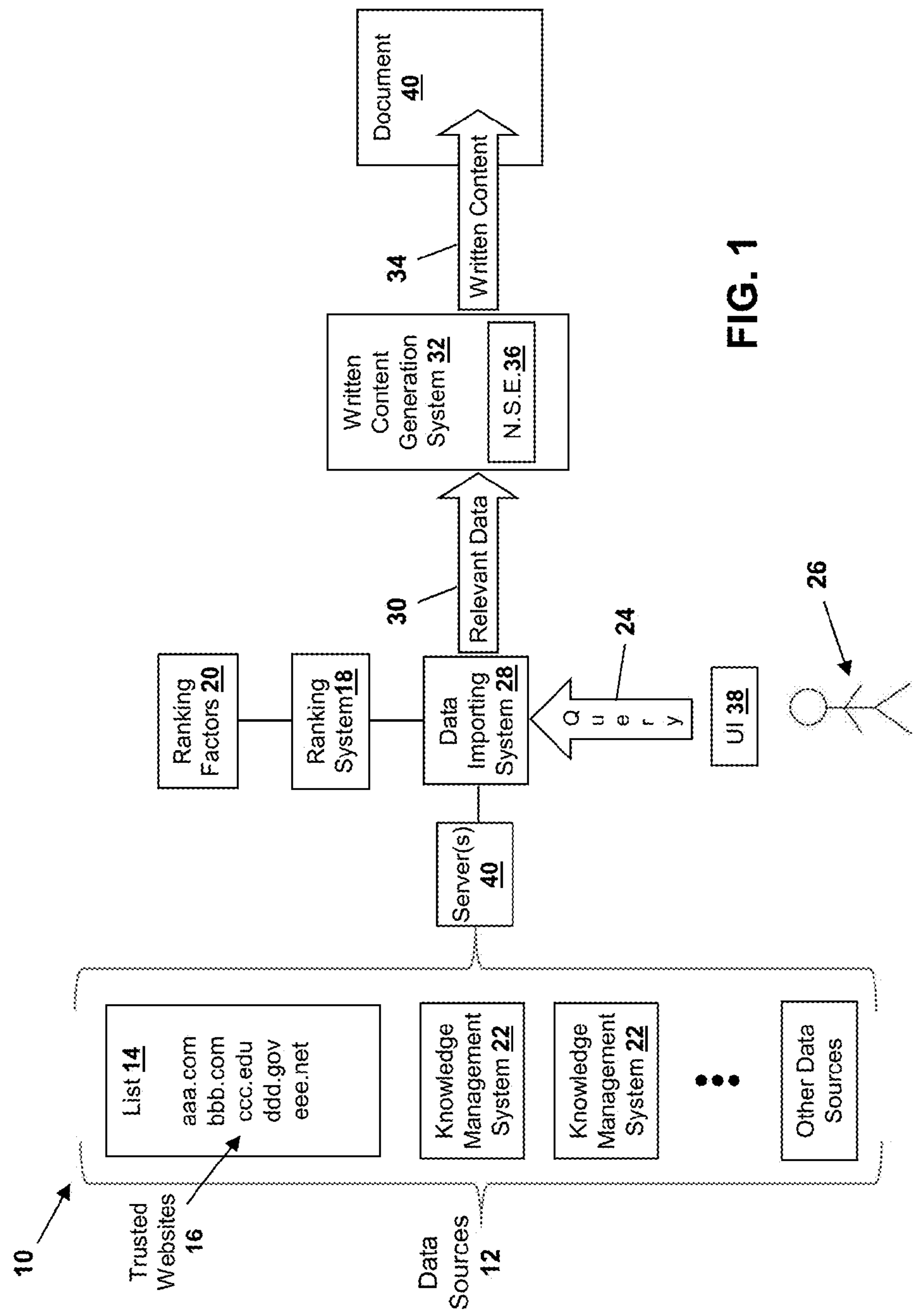
FIG. 1 depicts an illustrative written content generation system, according to embodiments.

A written content generation system 10 according to one or more embodiments of the present invention is depicted in FIG. 1.

The written content generation system 10 obtains data from one or more data sources 12. The data sources 12 may include, for example, a list 14 of one or more trusted websites 16 on the Internet. Such trusted websites 16 may include, for example, websites that have been determined to be reliable sources of information by a community of users (e.g., an analyst community). Each trusted website 16 may be scored, rated, and/or prioritized by a ranking system 18 for reliability and/or trustworthiness based on a number of ranking factors 20, at least some of which may be set by a user. The ranking factors 20 may include, for example, total page views for the website, expertise of the author(s) of the data presented on the website, comments regarding the data presented on the website, crowd-sourced ratings of the website, number of times the data presented on the website has been shared, reputation of the entity associated with the website (e.g., based on Forrester Reports, McKinsey Reports, etc.), other crowd-sourcing metrics, and/or the like.

The data sources 12 may also include one or more knowledge management systems 22. A knowledge management system 22 can generally be considered to be an internal information system (e.g., an intranet of a company) or an external information system developed to support and enhance the organizational knowledge processes of knowledge creation, storage, retrieval, transfer, and application. Knowledge management system 22 may include, for example, expert systems, groupware, document management systems, decision support systems, database management systems, simulation systems, and/or the like. Examples of knowledge management systems 22 include Microsoft Sharepoint, IBM Connections, Dropbox, etc., as well as any number of systems used to maintain massive amounts of content including purchased repositories such as Google. The ranking system 18 can be used to score, rate, and/or prioritize the knowledge management systems 22 and the content thereof for reliability and/or trustworthiness based on a number of ranking factors 20, in a manner similar to that described above with regard to the trusted websites.

In response to the receipt of a query 24 from a user 26 (e.g., a human user, system user, application, etc.), a data importing system 28 identifies and imports relevant data 30 from one or more of the data sources 12. A written content generation system 32 receives the imported relevant data 30 and generates written content 34 (e.g., in a document 40).

The written content generation system 32 may include a narrative science engine 36 for generating the written content 34. The written content 34 can be customized for different file formats (e.g., bullet points for presentation software slides, sentences for word processing software, etc). A user interface 38 may be provided to enable the user 26 to specify, for example, user specified metrics (e.g., for use by the ranking system 18), the scope of the data to be imported by the data importing system 28, and to specify, for example, the type and subject matter of the written content output by the narrative science engine 34 of the written content generation system 32.

Unlike previously available systems, the written content generation system 10 of the present invention includes a ranking system 18 that is configured to score, rate, and/or prioritize the reliability and/or trustworthiness of websites, internal and external knowledge management systems, and data (e.g., documents) stored thereon, based on a number of ranking factors 20, which may include user defined metrics. For example, a first document on a website of a highly reputable company may have a higher ranking than a second document generated by an inexperienced employee and stored in a company's internal knowledge management system. To this extent, the first document may be imported by the data importing system 28 with a higher precedence. As another example, a third document generated by an executive of a company or via a center of excellence is likely to have a higher ranking than a fourth document found on Wikipedia. In this case, the third document may also be imported by the data importing system 28 with a higher precedence.

The number of times a document has been accessed in the past may also be used by the ranking system 18 to rank websites, internal and external knowledge management systems, and data (e.g., documents) stored thereon. For instance, a document accessed 100 times in the past year may be ranked higher than a document obtained 10 times during the same time span. The more highly accessed document may be imported by the data importing system 28 with a higher precedence.

In addition to being able to ingest content from websites and internal and external knowledge management systems, the present invention is configured to auto-populate (and format) various documents with corresponding content. Such documents may include, for example, word-processing documents, presentation documents, spreadsheet documents, and/or the like.

In an embodiment, the data importing system 28 is provided in a macro or plug-in of an application, such as a word processing application, a presentation application, or a spreadsheet application. The macro or plug-in is configured to import data (e.g., web pages, relevant citations, documents, content excerpts, contacts, and/or the like) for use in a document in response to user inputted search criteria (e.g., via a query or find operation).

The relevant data 30 imported via the data importing system 28 is provided to a written content generation system 32 that is part of the same or different macro or plug-in of the application. The written content generation system 32 passes the relevant data 30 through the narrative science engine 36, which automatically writes data into the document 40.

The user interface 38 of the present invention enables a user 26 to guide the written content generation system 10 as to what type of written content 34 is to be included in the document 40 by the written content generation system 32. The user interface further enables a user 26 to specify the scope of the relevant data that is imported from the data sources 12 for use by the written content generation system

32. The user interface 38 may also be used to input/set at least some of the ranking factors 20.

Figure 2:
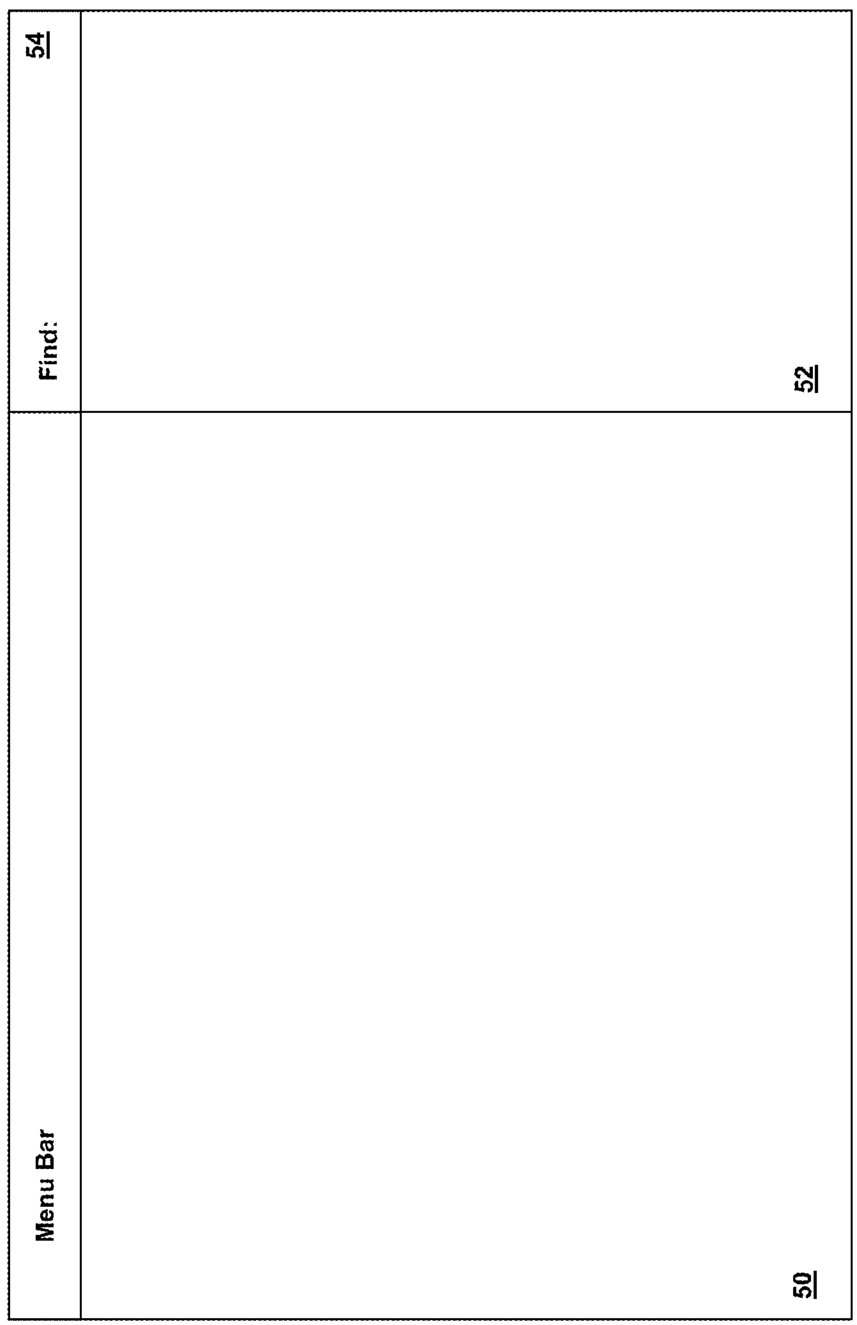
FIGS. 2-4 depict an illustrative user interface of an application incorporating a written content generation system, according to embodiments.
Figure 3:
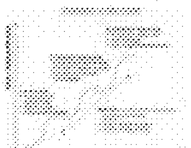
Figure 4:
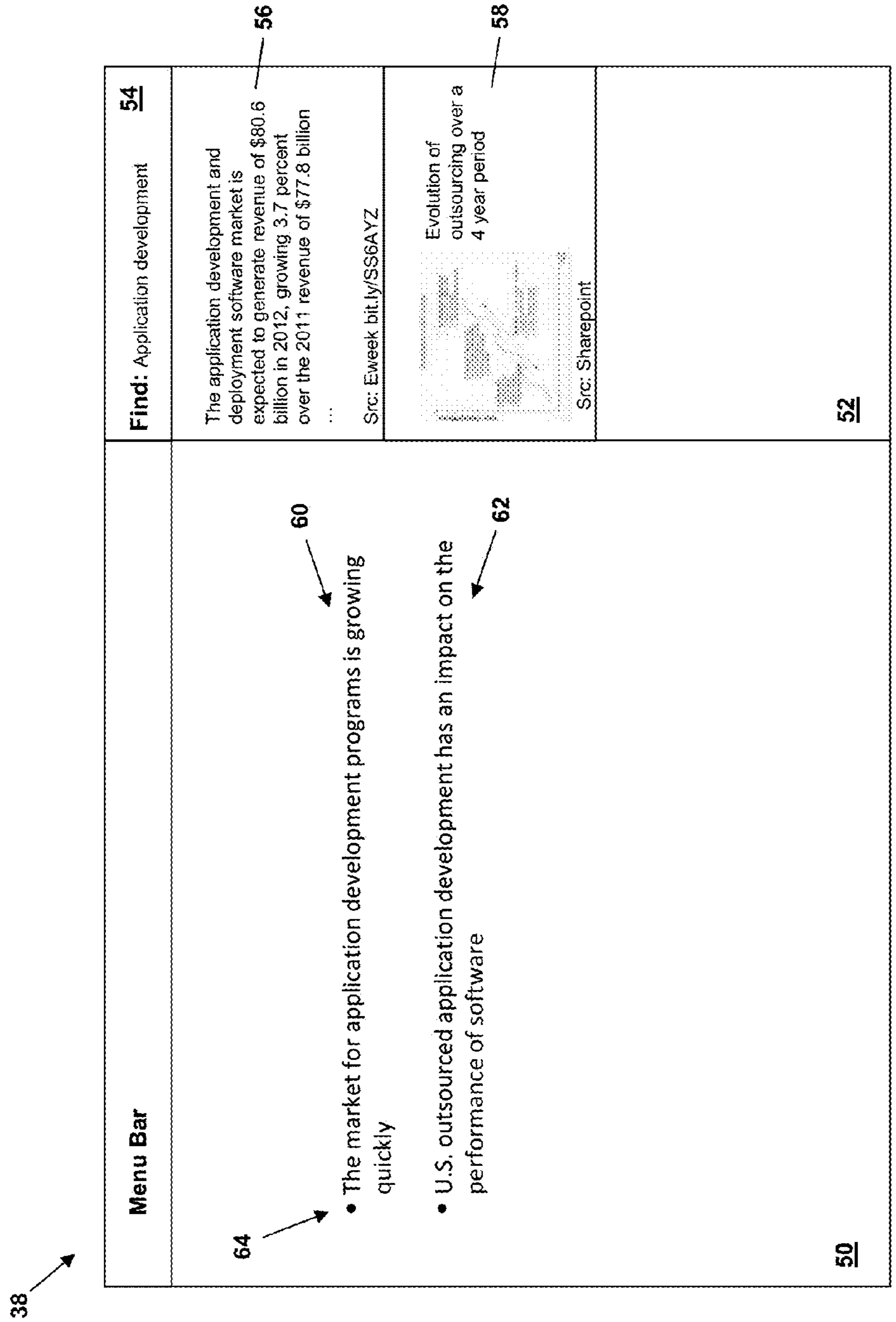

An example of the operation of the written content generation system 10 in association with a presentation application is depicted in FIGS. 2-4. Reference is also made to the components of the written content generation system 10 shown in FIG. 1. In this example, a user is drafting a presentation related to application development and the impact of outsourcing.

A text window 50 of a user interface 38 is depicted in FIG. 2. As shown, a sidebar 52 is located adjacent the window 50. A query (e.g., find) window 54 is also shown.

In FIG. 3, in response to a query related to the keyphase "application development," the data importing system 28 returns data 56 from one of the websites in the list 14 of trusted websites 16. This data 56 is displayed in the sidebar 52 of the user interface 38. In this example, data 56 from a single website (e.g., the highest ranked website in the list 14 of trusted websites 16 as determined by the ranking system 18) has been provided by the data importing system 28. Typically, however, data from multiple websites in the list 14 of trusted websites 16 may be provided by the data importing system 28.

In addition to the website data 56, as shown in FIG. 3, the data importing system 28 may return data 58 (e.g., a presentation slide) from one of the knowledge management systems 22 in response to the query for the keyphase "application development." This data 58 may also be displayed in the sidebar 52. In this example, the data 58 has been imported by the data importing system 28 from a single knowledge management system 22 (e.g., a company's intranet). However, in many cases, data from multiple knowledge management systems 22 (which may also be ranked by the ranking system 18) may be provided by the data importing system 28.

In some embodiments, one or more servers 40 may be provided between the knowledge management systems 22 and the data importing system 28. Such a server 40 may also be incorporated into (or otherwise associated with) the data importing system 28. Each server 40 can be used to store indices associated with the data from one or more of the knowledge management systems to enable faster content loading by the data importing system 28. This may be accomplished, for example, by deconstructing the data received from the knowledge management system 22 and importing only the portion of the data that is located in an area around the keyphrase. Natural language processing can be used to determine how much of the content to import. Precedence can be used, for example, to establish whether a single sentence should be imported, or a paragraph, or an entire page/slide, etc. A scoring mechanism may be leveraged here to determine the size of the import.

The narrative science engine 36 ingests the data 56, 58 and, as shown in FIG. 4, generates corresponding written content 34 in the text window 50 of the user interface 38. In the present invention, for example, the narrative science engine 36 may generate the following text 60 based on the data 56: "The market for application development programs is growing quickly." Further, the narrative science engine 36 may generate the following text 62 based on the data 58: "U.S. outsourced application development has an impact on the performance of software." Since the text is being provided by the narrative science engine 36 for presentation software, the narrative science engine 36 may automatically format the text 60, 62 by including bullet points 64, which are commonly used in presentation slides. Other portions of the data 56, 58 (or other imported data) can be converted by the narrative science engine 36 to provide additional supporting written content 34 in the text window 50 of the user interface 38, and the written content 34 can be combined by the narrative science engine 36 with other internet or document data to insert complete paragraphs.

The user interface 38 may be provided in a variety of formats to allow for maximum usability. An HTML version of the user interface 38 may be used, for example, on a desktop or laptop computer, as well as on mobile devices such as tablets and smart phones. The user interface 38 may include a query input (e.g., such as query window 54) and/or other input mechanisms for prompting a user for search criteria, scoring metrics (e.g., for use by the ranking system 18), and output format such as results only and/or results with content generation. The user interface 38 may take advantage of speech-to-text systems (e.g., Siri), where the user can ask a question in natural language and the system can reply with either a direct search or adjusted parameters.

Figure 5:
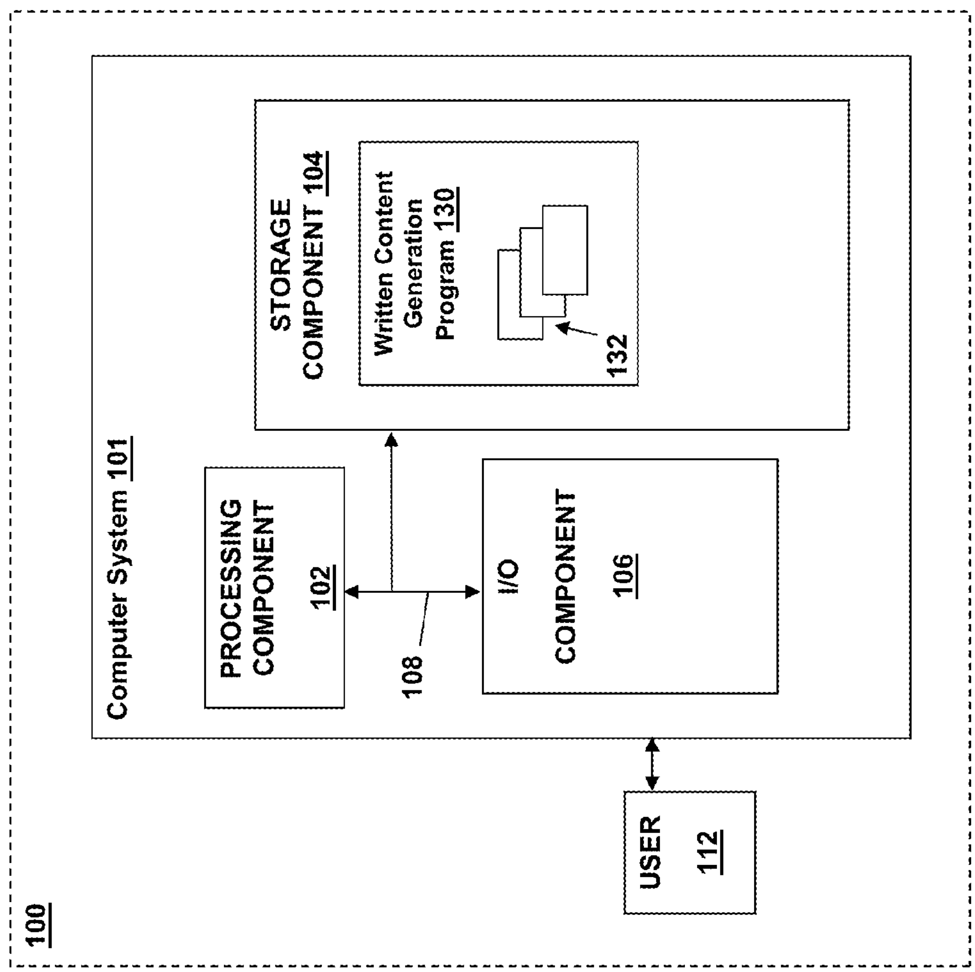
FIG. 5 shows an illustrative environment for written content generation according to embodiments.

The user interface 38 may also be configured to allow the user to specify the scope of what can or should be searched. For example, part of what consultants are paid for is to only use highly trusted market sources and data points that can withstand client pushback. In this case, internet sources would be eliminated, and the algorithm would focus on finding, for example, articles from sites such as 'BlueMine', publications from a short list of trusted sites, communities of prior published information within one or more companies or organizations, and/or the like. On the other side of the spectrum is quick market sizing reports, or internal analysis, where speed is more important. The scope here may rely more heavily on internet search, since broad stroke information is likely to be found due to a higher volume of available content. Once the solution is implemented it can enable the capabilities of consolidating data services such as Factiva and/or the like to include other data sources and extend their services to their customers Another approach is to enable the user to specify the scoring threshold allowed for content to be displayed or be included as part of the text that is generated. The threshold scores may be managed independently, or as a single score for all of the sources. The scope of import may also include people that may be the best contacts based on the content. Examples may include people in a user's network or a company's network that have relevant keywords in their title or keywords that show up in their social media accounts. Additionally, the original author of an article or other document may be imported (with checks to make sure they are still at the company, etc) and the proper citations/bibliography may be inserted into the generated content An illustrative environment 100 for written content generation according to embodiments according to embodiments is shown in FIG. 5. The environment 100 includes at least one computer system 101 and a written content generation program 130 that can perform processes described herein.

The computer system 101 is shown including a processing component 102 (e.g., one or more processors), a storage component 104 (e.g., a storage hierarchy), an input/output (I/O) component 106 (e.g., one or more I/O interfaces and/or devices), and a communications pathway 108. In general, the processing component 102 executes program code, such as the written content generation program 130, which is at least partially fixed in the storage component 104. While executing program code, the processing component 102 can process data, which can result in reading and/or writing transformed data from/to the storage component 104 and/or the I/O component 106 for further processing. The pathway 108 provides a communications link between each of the components in the computer system 101. The I/O component 106 can include one or more human I/O devices, which enable a human user 112 to interact with the computer system 101 and/or one or more communications devices to enable a system user 112 to communicate with the computer system 101 using any type of communications link. To this extent, the written content generation program 130 can manage a set of interfaces (e.g., graphical user interface(s), application program interfaces, communication interface(s), and/or the like) that enable human and/or system users 112 to interact with the written content generation program 130. Furthermore, the written content generation program 130 can manage (e.g., store, retrieve, create, manipulate, organize, present, etc.) the data, using any solution.

The computer system 101 can include one or more general purpose computing articles of manufacture (e.g., computing devices) capable of executing program code, such as the written content generation program 130, installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the written content generation program 130 can be embodied as any combination of system software and/or application software.

Furthermore, the written content generation program 130 can be implemented using a set of modules 132. In this case, a module 132 can enable the computer system 20 to perform a set of tasks used by the written content generation program 130, and can be separately developed and/or implemented apart from other portions of the written content generation program 130. As used herein, the term "component" means any configuration of hardware, with or without software, which implements the functionality described in conjunction therewith using any solution, while the term "module" means program code that enables a computer system 101 to implement the actions described in conjunction therewith using any solution. When fixed in a storage component 104 of a computer system 101 that includes a processing component 102, a module is a portion of a component that implements the actions. Regardless, it is understood that two or more components, modules, and/or systems may share some/all of their respective hardware and/or software. Furthermore, it is understood that some of the functionality discussed herein may not be implemented or additional functionality may be included as part of the computer system 101.

When the computer system 101 includes multiple computing devices, each computing device can have only a portion of the written content generation program 130 fixed thereon (e.g., one or more modules 132). However, it is understood that the computer system 101 and the written content generation program 130 are only representative of various possible equivalent computer systems that may perform a process described herein. To this extent, in other embodiments, the functionality provided by the computer system 101 and the written content generation program 130 can be at least partially implemented by one or more computing devices that include any combination of general and/or specific purpose hardware with or without program code. In each embodiment, the hardware and program code, if included, can be created using standard engineering and programming techniques, respectively.

When the computer system 101 includes multiple computing devices, the computing devices can communicate over any type of communications link. Furthermore, while performing a process described herein, the computer system 101 can communicate with one or more other computer systems using any type of communications link. In either case, the communications link can include any combination of various types of optical fiber, wired, and/or wireless links; include any combination of one or more types of networks; and/or utilize any combination of various types of transmission techniques and protocols.

While shown and described herein as a method and system for written content generation, it is understood that aspects of the invention further provide various alternative embodiments. For example, in one embodiment, the invention provides a computer program fixed in at least one computer-readable storage medium, which when executed, enables a computer system to for detect illegal activity through interpersonal relationship resolution. To this extent, the computer-readable storage medium includes program code, such as the written content generation program 130, which enables a computer system to implement some or all of a process described herein. It is understood that the term "computer-readable storage medium" includes one or more of any type of tangible medium of expression, now known or later developed, from which a copy of the program code can be perceived, reproduced, or otherwise communicated by a computing device. For example, the computer-readable medium can include: one or more portable storage articles of manufacture; one or more memory/storage components of a computing device; paper; and/or the like.

Another embodiment of the invention provides a method of providing a copy of program code, such as the written content generation program 130, which enables a computer system to implement some or all of a process described herein. In this case, a computer system can process a copy of the program code to generate and transmit, for reception at a second, distinct location, a set of data signals that has one or more of its characteristics set and/or changed in such a manner as to encode a copy of the program code in the set of data signals. Similarly, an embodiment of the invention provides a method of acquiring a copy of the program code, which includes a computer system receiving the set of data signals described herein, and translating the set of data signals into a copy of the computer program fixed in at least one computer-readable medium. In either case, the set of data signals can be transmitted/received using any type of communications link.

Still another embodiment of the invention provides a method for providing written content generation. In this case, a computer system, such as the computer system 101, can be obtained (e.g., created, maintained, made available, etc.) and one or more components for performing process(es) described herein can be obtained (e.g., created, purchased, used, modified, etc.) and deployed to the computer system. To this extent, the deployment can include one or more of: (1) installing program code on a computing device; (2) adding one or more computing and/or I/O devices to the computer system; (3) incorporating and/or modifying the computer system to enable it to perform a process described herein; and/or the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual skilled in the art are included within the scope of the invention as defined by the accompanying claims.

What is claimed is:

1. A method for generating written content in an application, comprising:

importing data from a plurality of data sources in response to a user query, wherein the plurality of data sources include at least one website determined to be a reliable source of information by a community of users, at least one internal knowledge management system, and at least one external knowledge management system;

ranking the plurality of data sources based on a plurality of ranking factors, wherein the plurality of ranking factors include: total page views for each website, expertise of at least one author of data presented on each website, comments regarding the data presented on each website, crowd-sourced ratings of each website, a number of times the data presented on each website has been shared, and a reputation of an entity associated with the website;

ranking the imported data imported from the plurality of data sources based on the ranking of the plurality of data sources to determine a relevance of the imported data;

displaying, on a user interface, the imported data having a relevance above a user selected scoring threshold;

automatically generating written content using at least a portion of the imported data displayed on the user interface based on the determined relevance of the imported data, wherein a size of the portion of the imported data used to automatically generate the written content decreases as the relevance of the imported data decreases; and automatically customizing the written content based on a file format of the application.

2. The method of claim 1, further comprising inputting user defined metrics via a user interface, wherein the ranking factors include at least one of the user defined metrics.

3. The method of claim 2, further comprising:

setting a scope of the data to be imported via the user interface.

4. The method of claim 1, wherein automatically generating written content is performed by a narrative science engine.

5. The method of claim 1, wherein the method is performed by a plug-in or macro of the application.

6. A computer system that includes a processing component, for performing a method for generating written content in an application by performing actions including:

importing data from a plurality of data sources in response to a user query, wherein the plurality of data sources includes at least one website determined to be a reliable source of information by a community of users, at least one internal knowledge management system, and at least one external knowledge management system;

ranking the plurality of data sources based on a plurality of ranking factors, wherein the plurality of ranking factors include: total page views for each website, expertise of at least one author of data presented on each website, comments regarding the data presented on each website, crowd-sourced ratings of each website, a number of times the data presented on each website has been shared, and a reputation of an entity associated with the website;

ranking the imported data imported from the plurality of data sources based on the ranking of the plurality of data sources to determine a relevance of the imported data;

displaying, on a user interface, the imported data having a relevance above a user selected scoring threshold;

automatically generating written content using at least a portion of the imported data displayed on the user interface based on the determined relevance of the imported data, wherein a size of the portion of the imported data used to automatically generate the written content decreases as the relevance of the imported data decreases; and automatically customizing the written content based on a file format of the application.

7. The system of claim 6, wherein the method further comprises inputting user defined metrics via a user interface, wherein the ranking factors include at least one of the user defined metrics.

8. The system of claim 7, wherein the method further comprises:

setting a scope of the data to be imported via the user interface.

9. The system of claim 6, wherein automatically generating written content is performed by a narrative science engine.

10. The system of claim 6, wherein the method is performed by a plug-in or macro of the application.

11. A computer program product comprising program code embodied in at least one computer-readable storage medium, which when executed, enables a computer system to implement a method for generating written content in an application, the method comprising:

importing data from a plurality of data sources in response to a user query, wherein the plurality of data sources include at least one website determined to be a reliable source of information by a community of users, at least one internal knowledge management system, and at least one external knowledge management system;

ranking the plurality of data sources based on a plurality of ranking factors, wherein the plurality of ranking factors include: total page views for each website, expertise of at least one author of data presented on each website, comments regarding the data presented on each website, crowd-sourced ratings of each website, a number of times the data presented on each website has been shared, and a reputation of an entity associated with the website;

ranking the imported data imported from the plurality of data sources based on the ranking of the plurality of data sources to determine a relevance of the imported data;

displaying, on a user interface, the imported data having a relevance above a user selected scoring threshold;

automatically generating written content using at least a portion of the imported data displayed on the user interface based on the determined relevance of the imported data, wherein a size of the portion of the imported data used to automatically generate the written content decreases as the relevance of the imported data decreases; and automatically customizing the written content based on a file format of the application.

12. The computer program product of claim 11, further comprising inputting user defined metrics via a user interface, wherein the ranking factors include at least one of the user defined metrics.

13. The computer program product of claim 12, further comprising:

setting a scope of the data to be imported via the user interface.

14. The computer program product of claim 11, wherein automatically generating written content is performed by a narrative science engine.

15. The computer program product of claim 11, wherein the method is performed by a plug-in or macro of the application.

* * * * *